US 8,398,764 B2
Mar. 19, 2013

(12) United States Patent
Mahoney et al.

(54) TITANIUM AND ZIRCONIUM MIXTURES AND EMULSIONS FOR USE IN PREPARING GYPSUM WALLBOARD

(75) Inventors: Dennis Michael Mahoney, Chester Springs, PA (US); Jonathan Stuart, Lansdale, PA (US); John H. Burns, Gap, PA (US)

(73) Assignee: Henry Company LLC, El Segundo, CA (US)

( * ) Notice: Subject to any disclaimer, the term of this patent is extended or adjusted under 35 U.S.C. 154(b) by 390 days.

(21) Appl. No.: 12/634,387

(22) Filed: Dec. 9, 2009

(65) Prior Publication Data

US 2010/0152347 A1 Jun. 17, 2010

Related U.S. Application Data

(60) Provisional application No. 61/122,175, filed on Dec. 12, 2008.

(51) Int. Cl.
*C04B 24/40* (2006.01)
*C08L 91/06* (2006.01)

(52) U.S. Cl. ... 106/781; 106/271; 106/311; 106/287.19; 106/822; 106/823

(58) Field of Classification Search .................. 103/271; 106/271, 287.19, 311, 781, 822, 823
See application file for complete search history.

(56) References Cited

U.S. PATENT DOCUMENTS

| | | | |
|---|---|---|---|
| 2,198,776 A | 4/1940 | King et al. | |
| 4,042,409 A | 8/1977 | Terada et al. | |
| 4,434,196 A | 2/1984 | Robinson et al. | |
| 4,748,196 A | 5/1988 | Kuroda et al. | |
| 5,120,355 A | 6/1992 | Imai | |
| 5,177,120 A | 1/1993 | Hare et al. | |
| 5,264,028 A | 11/1993 | Beshay | |
| 5,437,722 A | 8/1995 | Borenstein | |
| 5,695,551 A | 12/1997 | Buckingham et al. | |
| 5,695,553 A | 12/1997 | Claret et al. | |
| 5,821,298 A | 10/1998 | Reynolds et al. | |
| 5,968,237 A | 10/1999 | Sinnige | |
| 6,001,286 A | 12/1999 | Sleeter | |
| 6,010,596 A | 1/2000 | Song | |
| 6,051,155 A | 4/2000 | Hocken et al. | |
| 6,171,388 B1 | 1/2001 | Jobbins | |
| 6,585,820 B2 | 7/2003 | Wantling et al. | |
| 6,663,707 B2 | 12/2003 | Wantling et al. | |
| 6,811,824 B2 | 11/2004 | Hassan et al. | |
| 6,890,976 B2 | 5/2005 | Sinnige | |
| 6,890,982 B2 | 5/2005 | Borsinger et al. | |
| 6,902,615 B2 | 6/2005 | Shoshany | |
| 7,192,909 B2 | 3/2007 | Richter et al. | |
| 7,267,743 B2 | 9/2007 | Borsinger et al. | |
| 7,294,189 B2 | 11/2007 | Wantling | |
| 7,615,504 B2 | 11/2009 | Porter et al. | |
| 2002/0017222 A1 | 2/2002 | Luongo | |
| 2004/0083928 A1 | 5/2004 | Shoshany | |
| 2004/0147644 A1 | 7/2004 | Sinnige | |
| 2004/0157962 A1 | 8/2004 | Sinnige | |
| 2005/0132926 A1 | 6/2005 | Cui et al. | |
| 2006/0029785 A1 | 2/2006 | Wang et al. | |
| 2006/0029787 A1 | 2/2006 | Wang et al. | |
| 2006/0035112 A1 | 2/2006 | Veeramasuneni et al. | |
| 2006/0196391 A1 | 9/2006 | Hassan et al. | |
| 2006/0283356 A1 | 12/2006 | Donlon et al. | |
| 2007/0095723 A1 | 5/2007 | Baralt et al. | |
| 2007/0181035 A1 | 8/2007 | Wantling et al. | |
| 2007/0245931 A1 | 10/2007 | Wantling | |
| 2008/0003384 A1 | 1/2008 | Murphy et al. | |
| 2008/0286609 A1 | 11/2008 | Surace et al. | |
| 2010/0043344 A1 | 2/2010 | Tada et al. | |
| 2010/0116406 A1 | 5/2010 | Mahoney et al. | |
| 2010/0186870 A1 | 7/2010 | Stuart et al. | |
| 2011/0257301 A1 | 10/2011 | Stuart et al. | |

FOREIGN PATENT DOCUMENTS

| | | |
|---|---|---|
| CA | 2292467 C | 1/2008 |
| CN | 1624206 A | 1/2008 |
| CN | 11113083 A | 1/2008 |
| EP | 0 692 924 A1 | 1/1996 |
| EP | 1 947 070 A1 | 9/2006 |
| GB | 1 471 713 A | 4/1977 |
| JP | 59-058067 A2 | 4/1984 |
| JP | 60-262854 A2 | 12/1985 |
| JP | 61-042572 A | 3/1986 |
| JP | 2000/233962 A2 | 8/2000 |
| JP | 2001/181016 A2 | 7/2001 |
| WO | WO 2007/061093 A1 | 5/2007 |

OTHER PUBLICATIONS

International Search Report and Written Opinion of the ISA/US FOR International Application No. PCT/US2009/067295, dated Feb. 5, 2010.
Pingel, Laura Jean, Thesis, "Studies on Bonding In Paper—Gypsum Composite Structures." Chapter 5.1.2 Coupling Agent Additions, May 1990, 171 pages (see pp. 99-108, 163-165).
Tomasiewicz, Ryan, Thesis "The Adhesion of Paperboard to the Gypsum Core of Wallboard: An Investigation of Adhesive Bond Quality in Reponse to Paper Production Variables and Relative Humidity," Jun. 2003, 70 pages (see pp. 20-21).

(Continued)

*Primary Examiner* — David M Brunsman
(74) *Attorney, Agent, or Firm* — Flaster/Greenberg, P.C.

(57) ABSTRACT

Provided herein are mixtures, emulsions and other additives for use in manufacturing gypsum wallboard. The mixtures and emulsions may be wax-based emulsions or wax-free mixtures or emulsions, with wax-based emulsions including water, at least one wax, a dispersant which may include sulfur or a sulfur-containing group, and an additive comprising an organic titanium compound or organic zirconium compound. Mixtures may also be prepared including water, a dispersant; and an additive comprising an organic titanium compound or organic zirconium compound. Gypsum slurries may be prepared using such emulsions and mixtures and/or through addition of an organic titanium compound or organic zirconium compound.

19 Claims, No Drawings

OTHER PUBLICATIONS

Poirier, M.R., et al., "Cross-Flow Filtration Demonstration for Slurries Containing High Level Waste Sludge and Monosodium Titanate," Westinghouse Savannah River Company, Dec. 12, 2001, 27 pages.

Lee, Sallie, et al., "A New Generation of Gypsum Dispersing Agents," Lyondell Chemical Company, Global Gypsum Conference 2003 Barcelona, Sep. 14-16, 2003, 12 pages.

Monte, Salvatore, "Titanates," Kenrich Petrochemicals, Inc., Chapter 4, 26 pages.

Monte, Salvatore J., Titanates and Zirconates—Nano Technology In Coatings 2007, Kenrich Petrochemicals, Inc., ICE 2007, 291 pages (See pp. 1-40).

PCT International Preliminary Report on Patentability, International Application No. PCT/US2009/067295, Jun. 14, 2011, 5 pages.

PCT International Search Report and Written Opinion, International Application No. PCT/US2009/067295, Feb. 5, 2010, 7 pages.

Product Data Sheet, Ken-React® LICA® 2009—Titanate Coupling Agent, Sep. 26, 2007, 2 pages.

Material Safety Data Sheet, Ken-React® LICA® 09, Kenrich Petrochemicals, Inc., Dec. 2006, 6 pages.

TITANIUM AND ZIRCONIUM MIXTURES AND EMULSIONS FOR USE IN PREPARING GYPSUM WALLBOARD

BACKGROUND OF THE INVENTION

Gypsum wallboard is used for forming interior and exterior walls of many building structures. The structure of the wallboard typically includes a gypsum composition which is generally prepared as a slurry composition, placed between two liners and set. Such wallboard gypsum compositions may be standard wallboard formulations or made to be water-resistant through use of various wax emulsions. Some of the more common commercial water-resistant wax emulsions involve use of particular wax components (which may include a single wax, or more typically, a blend of waxes), saponifying agent(s), emulsifier(s), stabilizer(s) and other additives. Of growing importance in the wallboard industry is the ever-increasing cost of manufacture of wallboard with respect to the rising cost of formulation components as well as increasing energy costs. For example, it is known in the art that manufacturing methods for formation of building products like gypsum wallboard that use emulsions in formation of the finished products, typically require a drying step or steps that consume energy. It would be beneficial to manufacture gypsum wallboard (standard and water-resistant) if the drying energy could be reduced for cost savings, particularly when energy demands are growing for manufacturers.

With respect to the manufacture of water-resistant wallboards, U.S. Pat. No. 5,437,722 describes a water-resistant gypsum composition and wax emulsion therefor, which includes a paraffin hydrocarbon having a melting point of about 40° C. to 80° C., about 1 to 200 parts by weight montan wax per 100 parts of the paraffin hydrocarbon, and about 1 to 50 parts by weight polyvinyl alcohol per 100 parts of the paraffin hydrocarbon. The use of montan wax in the wax emulsion for water-resistant wallboard has been very effective and provides excellent performance. Other water-resistant formulations based on natural waxes other than montan (such as carnauba and bees wax) and/or synthetic waxes (such as Fischer-Tropsch wax) have also been used as alternative water-resistant wax formulations. Most such formulations provide good water-resistance in gypsum wallboard formulations. However, some waxes typically used for such emulsions are in limited supply and/or are very expensive. Further, while strong water-resistance can be achieved, it would be desirable to achieve good water resistance properties in gypsum wallboard, while lowering the cost of components, increasing supply and/or reducing manufacturing costs.

Accordingly, there is a need in the art for compositions and methods that reduce energy costs associated with the manufacture of gypsum formulations, as well as a way to maintain and/or reduce energy costs associated with the manufacture of water-resistant gypsum formulations, while maintaining desirable formulation properties.

SUMMARY OF THE INVENTION

The present invention relates to wax-based emulsions, wax-free mixtures and emulsions for gypsum-based building products, such as gypsum wallboards.

In one embodiment of the present invention, a wax emulsion is described which comprises water; at least one wax; a dispersant; and an additive comprising an organic titanium compound or an organic zirconium compound or combinations thereof. In that wax emulsion, the at least one wax may comprise, but is not limited to, one or more of montan wax, paraffin wax, carnauba wax, a Fischer-Tropsch wax, and derivatives and blends thereof. The wax emulsion can include a paraffinic hydrocarbon, which may be a paraffin wax. The wax emulsion can also include at least one stabilizer, such as polyvinyl alcohol, which may be a hydrolyzed polyvinyl alcohol. Optionally, the wax emulsion can also include saponifying agents such as alkali metal hydroxides. One example of such an alkali metal hydroxide is potassium hydroxide. The dispersant can be one which contains sulfur or a sulfur-containing group such as lignosulfonic acid, naphthalene sulfonic acid, and combinations and salts thereof.

In one embodiment, the wax emulsion noted above comprises about 35 percent to about 80 percent by weight of water; about 15 percent to about 60 percent by weight of a blend of paraffinic hydrocarbon and the at least one wax; about 0.01 percent to about 2 percent by weight of the dispersant, wherein the dispersant may be lignosulfonic acid, naphthalene sulfonic acid, and combinations and salts thereof; about 0.001 percent to about 10 percent by weight of the additive; and about 0 percent to about 30 percent by weight of at least one stabilizer.

In a further embodiment, the wax emulsion comprises about 50 percent to about 65 percent by weight of water; about 20 percent to about 40 percent by weight of the blend of paraffinic hydrocarbon and the at least one wax; about 0.1 percent to about 10 percent by weight of the dispersant; about 0.01 percent to about 5 percent by weight of the additive(s); and about 0 to about 10 percent by weight of the at least one stabilizer.

The organic zirconium or organic titanium compound additive in the above-embodiments may be one of the following: titanium IV 2,2(bis-2-propenolatomethyl) butanolato, tris-neodecanato-O; titanium IV 2,2(bis-2-propenolatomethyl)butanolato, tris(dodecyl)benezenesulfanato-O; titanium IV 2,2(bis-2-propenolatomethyl)butanolato, tris(dioctyl)pyrophosphate-O; titanium IV 2-propenolatomethyl, tris-isooctadecanoato-O; sodium zirconium lactate; triethanolamine titanium complex; titanium phosphate complex; alkanolamine titanate; and titanium chelate or combinations thereof.

The additive in a further embodiment has the chemical formula:

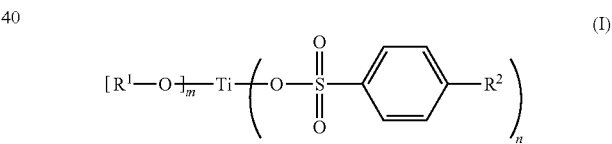

(I)

wherein $R^1$ may be a straight or branched chain, substituted or unsubstituted, alkyl, alkenyl, aralkyl, aralkenyl group of from about 5 to about 30 carbon atoms, wherein the group has from zero to or about 10 oxygen atoms; $R^2$ may be the same or different than $R^1$; and m and n are integers and each is at least 1 and no greater than 4. In yet a further preferred embodiment, $R^1$ is a branched chain alkenyloxy group of about 5 to about 12 carbon atoms and $R^2$ is different from $R^1$ and is a straight chain alkyl group of about 10 to about 15 carbon atoms; and m is 1 and n is 3. In a still further preferred embodiment, the additive has the chemical formula:

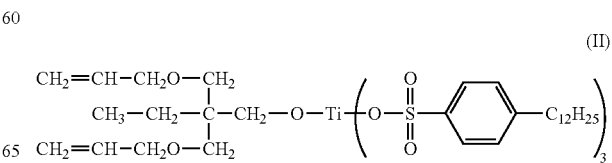

(II)

In another embodiment, mixtures may be made to be wax-free or modified to form an emulsion. The wax-free mixture comprises water; a dispersant; and an additive blend(s) comprising an organic titanium compound or an organic zirconium compound or combinations thereof. In such a mixture, a stabilizer may be provided, but is not required. The stabilizer, if used, may be polyvinyl alcohol, which may be hydrolyzed polyvinyl alcohol. Stabilizers as noted above may also be provided, and the dispersants in this embodiment may also be one which contains sulfur or a sulfur-containing group such as lignosulfonic acid, naphthalene sulfonic acid, and combinations and salts thereof.

According to one embodiment of the invention, the mixture may comprise about 10 percent to about 60 percent by weight of water; about 30 percent to about 80 percent by weight of the dispersant or blends of dispersants, wherein the dispersant(s) may be lignosulfonic acid, naphthalene sulfonic acid, and combinations and salts thereof; about 0.1 percent to about 10 percent by weight of the additive; and about 0 percent to about 30 percent by weight of at least one stabilizer. In yet a further preferred embodiment, the mixture may comprise about 5 percent to about 50 percent by weight of water; about 40 percent to about 80 percent by weight of the dispersant; about 1 percent to about 8 percent by weight of the additive; and about 0 percent to about 5 percent by weight of the at least one stabilizer. Further, the organic zirconium compound or organic titanium compound additives may be those described above.

The present invention also includes a settable gypsum composition suitable for forming a gypsum product. The settable gypsum composition comprises a) a gypsum slurry and b) an additive comprising an organic titanium compound or an organic zirconium compound, wherein the ratio of titanium or zirconium compound to gypsum in the gypsum slurry is about 0.001:100 to about 10.0:100 by weight. The settable gypsum composition may further comprise a dispersant.

In another embodiment, the settable gypsum composition comprises a) a gypsum slurry and b) a mixture comprising water, a dispersant, and an additive comprising an organic titanium compound or an organic zirconium compound, wherein a ratio of titanium or zirconium compound to gypsum in the gypsum slurry is about 0.001:100 to about 10.0:100 by weight. The mixture for the settable gypsum composition can be a wax emulsion comprising at least one wax, a dispersant and an additive comprising an organic titanium compound or an organic zirconium compound provided in the ratios mentioned above. The gypsum product formed with the settable gypsum composition that includes the wax emulsion is water-resistant.

The present invention also includes an improved method for making gypsum wallboards. The method comprises preparing a gypsum slurry, and adding a mixture to the gypsum slurry, wherein the mixture comprises water, a dispersant, and an additive comprising an organic titanium compound or an organic zirconium compound, whereby the viscosity of the gypsum slurry is lowered to a desired level that minimizes the use of water to control the viscosity, and using the gypsum slurry to form a structure and drying the structure to form a gypsum wallboard. In other words, the addition of the mixture in the gypsum slurry results in a gypsum slurry that has the same viscosity with lower water content when compared to the conventional gypsum slurry formulation. Thus, the interim product from structures formed with such gypsum slurry will have lower water content and thus less water to be removed during the subsequent drying process to form the final gypsum-based product. In another embodiment, the mixture added to the gypsum slurry can be a wax emulsion comprising at least one wax, water, a dispersant and the resulting gypsum wallboard is water-resistant.

A further improvement includes a method of making gypsum wallboard, wherein the method comprises preparing a gypsum slurry, using the gypsum slurry to form a structure and drying the structure to form a gypsum wallboard, providing to the gypsum slurry an additive comprising an organic titanium compound or an organic zirconium compound. In one embodiment, this improvement further comprises providing a dispersant to the slurry.

The provision of the additive comprising an organic titanium compound or an organic zirconium compound according to the present invention results in an improved manufacturing process for gypsum-based building products. The additive acts as a surfactant for the gypsum crystals in the gypsum slurry and lowers the water content of the gypsum slurry while maintaining the desired viscosity conventionally achieved with higher water content in the gypsum slurry. This reduces the amount of water that needs to be removed during the subsequent drying process in forming the final gypsum-based building product, and thus reduces the amount of energy required during the manufacturing process. This translates into cost savings for the manufacturer of the building products.

Thus, the provision of the additive provides an improved, more energy efficient manufacturing method for the manufacture of gypsum-based building products such as gypsum wallboards.

DETAILED DESCRIPTION OF THE INVENTION

Described herein are various wax emulsions and mixtures which may be made to be wax-free or modified to form wax emulsions, methods for using such emulsions and mixtures, building product formulations including such emulsions and mixtures, improvements to the manufacture of such products using such emulsions and mixtures, gypsum slurry compositions and methods using such compositions. The emulsions, mixtures and compositions described herein are able to reduce energy costs and provide manufacturing cost savings by providing improved gypsum slurry viscosity that reduces water content in the gypsum slurry generally, so that the amount of heat required during the drying process is reduced. In addition, for water-resistant building products using the wax emulsions and mixtures described herein, the emulsions and mixtures are able to provide equivalent percentage water absorption while allowing for energy reduction in the manufacture of such building products by reducing drying times and/or by reducing heat.

The present invention includes both a wax emulsion for use in manufacturing gypsum-based building products that can provide water-resistance to gypsum-based building products, and a mixture which may optionally be modified to be emulsions, such that waxes and other wax-related additives are optional for such mixtures. In either case, the use of the wax emulsion and the mixture lowers the water content of the gypsum slurry while maintaining the desired viscosity and thus resulting in more energy efficient manufacturing process.

As used herein, an "emulsion" means an emulsified formulation of components, preferably including at least one wax. A "mixture," as that term is used herein, includes any combination of components in a formulation, whether in solution, dispersion, suspension or other liquefied form of combined ingredients. Mixtures herein may be modified with emulsification components and made into emulsions.

In a wax-based emulsion, according to a preferred embodiment, is an aqueous emulsion and includes water, at least one wax, a dispersant, and an additive which can be an organic titanium compound or an organic zirconium compound. The water for use in the emulsion may be any water suitable for forming wax emulsions for building products, and can be standard tap water, distilled water, or the like. Generally, the water content of the aqueous emulsion suitable for gypsum-based building products such as gypsum wall boards is about 35% to about 80%, preferably about 50% to about 65% by weight of the emulsion. For any given application, however, the water content may vary depending on the desired end properties.

The wax-based emulsions preferably include a paraffinic hydrocarbon, which is most preferably a paraffin wax. Such paraffin wax may be any suitable paraffin-based wax that functions compatibly with other waxes and components in the resulting wax emulsion, and further preferably has a melting point of about 40° C. to about 80° C., which properties are favorable for water-resistant wallboard manufacture. Other paraffinic hydrocarbons or paraffinic waxes may be used as well.

As defined herein, the at least one wax may include paraffin wax as well as other waxes known in the art or to be developed for use in water-resistant wallboard and various wax substitute components used in such a gypsum wallboard formulation. That is, one skilled in the art would further understand that the at least one wax component may include materials that substitute functionally for or otherwise satisfy the function of the wax material in the wax emulsions. Some examples of such substitute materials are synthetic polymers, fatty acid derivatives and the like that are modified to perform like waxes in such a formulation, siloxanes, any other wax substitute known or to be developed in the art, and derivatives and combinations of such materials.

Examples of waxes which may be used herein include natural montan wax, bleached or refined montan wax, carnauba wax, bees wax, scale wax, slack wax, petroleum waxes, polyethylene wax, soybean wax, corn wax, cottonseed wax, rapeseed wax, canola wax, sunflower wax, palm wax, palm kernel wax, coconut wax, cranberry wax, linseed wax and peanut wax. Other waxes which may be used include synthetic waxes like Fischer-Tropsch wax and mixtures of synthetic wax acids and synthetic wax esters. It should also be understood that derivatized versions of such waxes, to include various COOH or OH groups for performance, oxidized waxes, or combinations of such waxes (whether by blend or polymerized functionalizing of the base polymer as in a modified Fischer-Tropsch wax) can also be used. In one preferred embodiment, blends of saponifiable and non-saponifiable waxes, such as blends of paraffin wax with montan, carnauba and/or Fischer-Tropsch waxes are used.

It should be understood that while certain waxes as described herein are preferred, such as montan, carnauba and Fischer-Tropsch waxes, if the benefits of the additives herein are otherwise achieved within a wax-substituted product or other wax combination useful for water-resistant wallboard, the wax combination is contemplated as being within the scope of the invention herein, and the wax selections should not be seen as limiting the scope of the invention. For example, siloxanes (with and without catalytic or other additives) are known for use as water-resistant wax formulation substitutes for preparing water-resistant gypsum wallboard as described in U.S. Patent Publication No. 2006-0035112-A1, incorporated herein in relevant part with respect to the use of various siloxane formulations in preparing gypsum wallboard.

The at least one wax in the wax emulsion should preferably make up about 15 percent to about 60 weight percent of the wax emulsion, and more preferably about 20 percent to about 40 percent by weight. If a blend of a paraffinic hydrocarbon, such as a paraffin wax and another wax or waxes is used, it is preferred that the blend include about 99:1 to about 1:99 paraffin to the other wax(es) in the blend, more preferably about 80:20 to about 20:80, still more preferably about 70:30 to about 30:70, and most preferably 60:40 to 40:60. Further, the wax(es) (including substitutes) are most preferably included in such an emulsion in a total amount of about 1 part to about 200 parts, preferably about 1 part to about 50 parts, by weight, per 100 parts of the paraffinic hydrocarbon. Most preferred blends in the above-noted compositional ranges including paraffin wax and montan wax.

The wax emulsion can also include at least one stabilizer. The stabilizer(s) may be any stabilizer known to be used or to be developed for such use in water-resistant wax emulsion formulations. A preferred stabilizer herein is polyvinyl alcohol; preferably one that is prepared by hydrolysis of polyvinyl acetate and that is preferably a substantially completely or fully hydrolyzed polyvinyl alcohol. Most preferably it is at least about 90% hydrolyzed polyvinyl alcohol, and more preferably 97 or 98 to 100% hydrolyzed polyvinyl alcohol. Such polyvinyl alcohols are preferably used so as to be soluble in water at elevated temperatures of about 60° C. to about 95° C., but are insoluble in cold water. Stabilizer(s) are optional and, if used, can comprise from 0 up to about 30 percent by weight of the wax emulsion and preferably make up about 1 percent to about 30 percent by weight of the wax emulsion. In other embodiments, the stabilizers may be present in an amount of about 0 percent to about 20 percent by weight of the wax-based emulsion, more preferably about 0 to about 10 percent by weight and most preferably about 0.01 percent to about 8 percent by weight thereof. If polyvinyl alcohol is used as the stabilizer in combination with a wax blend based on a paraffin wax, it may be present in an amount of about 0 to about 50 parts, preferably about 1 part to about 20 parts by weight, per 100 parts of the paraffinic wax. The polyvinyl alcohol can provide adhesive characteristics as well as enhancing the water resistance.

In other embodiments, saponifiers or saponifying agents can also be used in the wax emulsions herein. Suitable saponifiers include any of a variety of alkali metal hydroxides and similar materials such as potassium hydroxide, ammonium hydroxide, sodium hydroxide, magnesium sulfate and the like. Saponifiers may be present in an amount of no greater than about 5 weight percent of the emulsion, preferably no greater than about 2 weight percent and most preferably about 0.01 weight percent to about 1 weight percent.

Dispersants are also used in the wax emulsion or the mixture formulations and are preferred for use in combination with the organic titanium compound and/or organic zirconium compound additives herein. Preferred dispersants include, but are not limited to those having a sulfur or a sulfur-containing group(s) in the compound such as sulfonic acids (R—S(=O)$_2$—OH) and their salts, wherein the R groups may be otherwise functionalized with hydroxyl, carboxyl or other useful bonding groups. Preferred are higher molecular weight sulfonic acid compounds such as lignosulfonic acid, naphthalene sulfonic acid, the sulfonate salts of these acids and derivatized or functionalized versions of these materials. In addition, other dispersants known in the art for use in wax emulsions, such as magnesium sulfate; ammonium hepta molybdate/starch combinations; non-ionic surfactants, ionic surfactants, zwitterionic surfactants and mixtures thereof; and alkyl quaternary ammonium montmorillonite clay as well as other known dispersants may be used. Dispersants are preferably present in an amount of about 1 percent by weight to about 10 percent by weight of the wax emulsion, and preferably about 1 percent to about 6 percent by weight of the wax emulsion.

The titanium- or zirconium-based compound additives for the wax emulsions herein are organic titanium compounds and/or organic zirconium compounds, preferably available in liquid form for ease of use, such as the preferred liquid titanate compounds herein. Such compounds are preferably of a structure wherein the metal atom is positioned so as to be bound to two, preferably three, and more preferably 4 or 5 organic ligands. Most preferably, the organic ligands are bound to the metal atom by a covalent bond and/or an ether linkage. The organic ligands may be typical organic groups, and preferably at least one is an aryl-containing group and/or is functionalized to have a surfactant-like ligand. Titanate compounds are most preferred. Suitable additive materials are commercially available. Exemplary commercial materials and their published chemical compound are described below.

One group of suitable compounds is sold by Kenrich Petrochemicals, Inc., Bayonne, N.J., as titanate coupling agents, under the trade name Ken-React® Lica®. Suitable compounds are sold as Lica® 01 (titanium IV 2,2(bis-2-propenolatomethyl) butanolato, tris-neodecanato-O), Lica 09 (titanium IV 2,2(bis-2-propenolatomethyl)butanolato, tris (dodecyl)benezenesulfanato-O) and Lica 38 (titanium IV 2,2 (bis-2-propenolatomethyl)butanolato, tris(dioctyl) pyrophosphate-O). Other useful products are sold by Kenrich as Ken-React KR-TTS (titanium IV 2-propenolatomethyl, tris-isooctadecanoato-O). Similar products to those of Kenrich are available from Anhui TaiChang Chemical, Shanghai, China. Still other useful products are sold as: sodium zirconium lactate, available as Tyzor® 217 and triethanolamine titanium complex, available as Tyzor TE, both from E.I. DuPont de Nemours Specialty Chemicals, Wilmington, Del.; titanium phosphate complex, alkanolamine titanates, and titanium chelates, each available from Borica, in Shanghai and Taipei, and sold under the trade names, Tytan® AP100 (titanium phosphate complex), Tytan CX200 (alkanolamine titanate), Tytan CX300 (alkanolamine titanate) and Tytan AQ33 (titanium chelate). One skilled in the art would know that these are commercial examples only, and not meant to be limiting. Similar materials from other manufacturers may also be used (as shown in the results below), or the compounds may be separately synthesized in accordance with any suitable synthesis known or to be developed in the art.

In one embodiment, the preferred additive is a liquid titanate and/or has a preferred chemical formula as shown below:

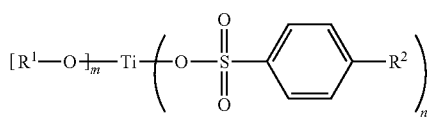

(I)

In formula (I), O—R$^1$ is a hydrolyzable-type group, wherein R$^1$ may be of a straight or branched chain structure. The group may also be substituted or unsubstituted with various functional groups if useful for compatibilizing or enhancing the functionality of the additives in the proposed emulsions and applications herein, including hydroxyl groups, carboxyl groups, sulfur atoms or sulfur-containing groups, nitrogen containing groups and the like. The R$^1$ group is preferably an alkyl, alkenyl, aralkyl, aralkenyl group, most preferably an alkenyl or unsaturated alkyl group, of from about 5 to about 30 carbon atoms, more preferably about 5 to about 12 carbon atoms. The group also preferably contains no greater than about 10 oxygen atoms, which oxygen atoms may be in a carbonyl group, ether linkage or of any other alkoxylated structure. Most preferably, at least two oxygen atoms are present.

R$^2$ may be the same or different than R$^1$. Preferably R$^2$ is different and is a straight chain alkyl group of about 10 to about 15 carbon atoms. R$^2$ provides a surfactant-type, emulsifiable group to the structure. In formula (I), m and n are integers and each is at least 1 and no greater than 4. Most preferably, m is 1 and n is 3. In a most preferred embodiment, the additive has the following chemical formula which is commercially available as Kenrich, Ken-React® Lica® 09:

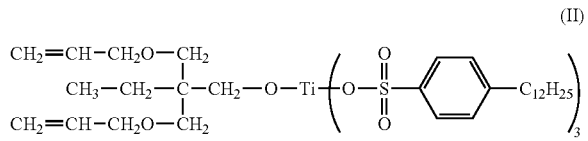

(II)

The organic titanium compound and/or organic zirconium compound additive may be present as a single component or a combination of such additives, but preferably only one additive compound is used. The additive preferably is present in the formulation in an amount of about 0.01 weight percent to about 10 weight percent or more of the formulation, and more preferably about 0.1 percent by weight to about 2 percent by weight of the wax emulsion formulation.

In one method of manufacture of an aqueous wax emulsion herein, the wax or waxes are each heated to the molten state, and if more than one wax is present, the waxes are then blended together. A hot aqueous solution of the other components, such as stabilizers, for example, polyvinyl alcohol, optional saponifiers, the dispersant(s), the additive and any other components used in the emulsion may then be passed with the hot blend of the waxes through a colloid mill and the resulting emulsion is allowed to cool.

Alternatively, a homogenizer may be used instead of a colloid mill. Such homogenizers may be the same general type of equipment used to homogenize milk and other products. In such a method, a mixture of the wax component and the emulsifying components are fed under high pressure (typically about 1500 psi to about 3500 psi) to emulsify the wax(es) and create a smaller particle size than is typically associated with use of a colloid mill. It will be understood to one skilled in the art based upon this disclosure that other manufacturing methods and types of equipment and procedures for preparing the emulsion can be used, as are known or which may be developed in the art. The emulsion of the invention may also readily be reformed by agitation, in the event that emulsified components of the emulsion separate on storage.

Also within the scope of the present invention are mixtures in which the at least one wax as defined herein is optional. Such mixtures can be prepared to be "wax-free," but can optionally be modified, prepared and provided with wax-based materials (or wax substitutes or other water-resistant gypsum additives such as siloxanes as described elsewhere herein) such as to be formed into emulsions. Such mixtures include water, dispersant(s) and at least one of the novel organic titanium compound and/or organic zirconium compound additives described hereinabove. Optionally, such mixtures also include one or more stabilizer(s). The water component, dispersant(s), titanium- or zirconium-containing additives, as well as any stabilizer(s) are the same materials noted above for use in the wax-based emulsions. Optional saponifiers, such as those mentioned hereinabove, may also be used, however, if the mixture is wax-free, such saponifiers would not necessarily function to saponify, but may be useful for adjustment of the pH of the mixture.

In one preferred embodiment, such a mixture is prepared including about 70 percent by weight to about 99.9 percent by weight, more preferably about 80 percent to about 99.9 percent by weight water; about 0.01 percent by weight to about 10 percent by weight, more preferably about 0.01 percent by weight to about 8 percent by weight of dispersant(s) (preferably a lignosulfonic acid or naphthalene sulfonic acid, or salt thereof, combinations of these materials or other known dispersants); about 0.001 percent by weight to about 10 percent by weight or more, more preferably 0.1 percent by weight to about 2.0 percent by weight of the additive, and optionally about 0 to about 30 percent, more preferably about 0 percent by weight to about 20 percent by weight, most preferably about 0 percent by weight to about 10 percent by weight, or about 0.01 percent to about 8 percent by weight of a stabilizer(s) (preferably polyvinyl alcohol as described herein). Optionally, other components such as the saponifier(s), pH adjustment additives or various other emulsion additives (including waxes) may be added to modify the mixture into an emulsion.

The mixtures in this embodiment, if prepared to be wax-free, may be made by simply combining the components as in the second step of preparing the non-wax phase of the wax-based emulsion using, for example, a colloid mill, homogenizer or a similar mixing mechanism.

The present invention also includes settable gypsum formulations which may include any of the wax emulsions or mixtures noted hereinabove or prepared directly using various components of such mixtures as described below. In preparing a gypsum wallboard using the wax emulsions, mixtures and components herein, an aqueous slurry of the gypsum material is prepared in any suitable manner known in the art or to be developed. In an embodiment of the invention, an aqueous wax emulsion or mixture according to the invention is then added to the slurry and mixed with the slurry in proportions to provide about 0.5 part to about 20 parts by weight of solids per 100 parts of gypsum. Alternatively, a gypsum slurry may be formed and the organic zirconium and/or organic titanium compound(s) are provided directly to the gypsum slurry without first being mixed with other components. Preferably, a dispersant such as those described herein is also added. The amount of dispersant may vary but preferably has a ratio with respect to the organic titanium and/or zirconium compound similar to that which is used and described herein, if these components are first used in an aqueous mixture and then added.

The base gypsum compositions may be varied in accordance with conventional gypsum formulation requirements in the art of gypsum manufacture. Other ingredients such as foaming agents, other dispersants and set accelerators may be included in the slurry. In addition, it is noted that in preferred embodiments of settable gypsum slurry formulations using the mixtures or emulsions described herein, or direct addition of organic titanium and/or organic zirconium compounds herein, a ratio of about 0.001:100 to about 10.0:100, more preferably about 0.01:100 to about 2.0:100, and most preferably about 0.1:100 to about 1.0:100 by weight, exists between the titanium or zirconium compounds and the gypsum in the slurry. While this is not required, it contributes to preferred slurry viscosity properties.

In preparing wallboards from such a settable gypsum formulation, the mixture of gypsum slurry and the mixtures, wax emulsions or organic titanium and/or zirconium compounds described herein can be applied to a first sheet of wallboard liner to form a layer of the gypsum mixture thereon. A second sheet of liner is then disposed on top of the deposited layer to form a wallboard assembly or structure in which the first and second sheets are in opposed, facing relationship and have the layer of the gypsum mixture therebetween.

Alternatively, the gypsum slurry may be prepared directly into a liner-less wallboard structure using manufacturing methods involving press-in-place molding and similar techniques, such that reference to gypsum wallboard herein is not restricted to liner-covered wallboard. However, it should be understood that any manufacturing technique for making wallboard including a settable gypsum formulation is within the scope of the invention described herein, such as for example, wallboard manufactured with glass mats on the exterior surfaces instead of standard liners.

The resulting structure or assembly may then be dried, such as by oven drying to remove excess water not needed for hydration of the gypsum, to leave finished gypsum wallboard. If liners are used, they may be formed of paper or may comprise fiberglass or organic fiber mats as well. Use of the emulsions and mixtures of the invention and/or providing the organic titanium and/or zirconium compounds herein to a slurry help to reduce drying time and/or heat, thereby contributing to energy savings in the manufacture of such gypsum wallboards. In forming water-resistant gypsum wallboard, wax-based emulsions herein are preferably used, and for standard wallboard, either the wax-free mixtures or wax-based emulsions may be used.

The present invention provides an improvement to prior methods of preparing gypsum wallboard, in that the emulsions and mixtures herein, when prepared and added to the gypsum slurry, or when directly providing to the gypsum slurry the organic zirconium and/or organic titanium compounds (preferably with a dispersant), help to provide a reduced slurry viscosity and thus reduced water content and enable reduction in drying time and/or heat, and thus the use of energy in manufacture. This method is also an improvement when using wax-based formulations herein in water-resistant gypsum wallboard. Thus, the invention further includes a method to reduce energy use in manufacture of building products, such as gypsum wallboard, by providing to the formulations used for forming such building products, prior to any drying step(s) in the manufacturing process of these building products an emulsion or mixture according to the invention as described herein or the direct addition of an organic titanium and/or organic zirconium compound, with a preferred dispersant. If a water-resistant gypsum wallboard is being formed, a wax-based emulsion as described herein is preferably used.

The invention will now be described with respect to the following non-limiting examples.

EXAMPLES 1-15

A variety of wax formulations (including three Control samples A, B and C) were prepared for evaluating wax formulations including the novel organic titanium compound or organic zirconium compound additives herein. The wax emulsions were prepared by mixing water, a dispersant, potassium hydroxide, and polyvinyl alcohol over a hot plate using an overhead mixer until the polyvinyl alcohol was melted and well dispersed (about 15 minutes with a hot plate set at 135° C. to 145° C.). In a separate container, paraffin and montan wax were melted over a hot plate until both were completely melted. After both the water mixture and the wax mixture were ready, the water mixture was placed into a mixing bowl and a mill was started. After the mill was up to full speed, the hot wax blend was slowly added. The resulting combined components were mixed at high speed for 60 seconds. At the end of 60 seconds, the liquid was transferred to a chilled metal vessel, which was immediately placed in an ice bath while mixing at low speed with an overhead mixer until the resulting emulsion was at room temperature.

Each of the formulations had the following basic composition: For the emulsification components; 60.4 weight percent water, 0.4 weight percent potassium hydroxide (45%), 2.4 weight percent hydrolyzed polyvinyl alcohol (with a manufacturer's specification of 98-98.8% hydrolyzed polyvinyl alcohol), and 1.5 weight percent dispersant (lignosulfonic acid, sodium salt). The wax components included 33.3 weight percent paraffin wax and 2.1 weight percent of one of the following waxes: montan wax, Fischer-Tropsch wax (Sasolwax) or carnauba wax. Three Control Samples (one based on each of montan (Control A), Fischer-Tropsch wax (Control B) and carnauba wax (Control C)) were prepared without the zirconium- or titanium-based additives described herein. The remaining inventive examples included various types of organic titanate or organic zirconate additives in varying amounts as noted in Table 1.

The emulsions were evaluated for % water absorption (which was measured using a two-hour soak test at 71° F.) and slurry viscosity. In these Examples, various criteria and properties were evaluated, specifically % water absorption (which was measured using a two-hour soak test at 71° F.), and slurry viscosity (measured in seconds using a Number 4 ford cup). Percentage solids for the formulations were kept in a standard target range of about 38-42 percent by weight. In addition, emulsion and foaming stability were observed for the various samples. Samples were evaluated as water reducers greater than control, and with respect to criteria evaluated for use in water-resistant gypsum wallboard, with water absorption viewed as a significant criteria (preferred absorption percentages being no greater than about 6% water absorption, and most preferred being no greater than about 5%) as well as with respect to the criteria of cost availability and other industrial use factors. Slurry viscosity was tested by pouring the slurry into a Number 4 Ford cup. The elapsed time for the slurry to empty out of the cup was recorded, as well as the resulting patty formed 12 cm under the Ford cup on a glass or Plexiglas surface. The patty was measured after the cup had completely emptied. The results of those tests appear in Table 2 below.

While some samples performed somewhat better in terms of water absorption, based on varied component amounts, generally it can be seen that the additives tested provided properties that were comparable, and in many cases better than the control having the comparable wax base component composition. In addition to providing the potential for good water absorption for manufacturing water-resistant gypsum wallboard, the inventive formulations assist in reducing slurry viscosity (increasing patty size) to minimize use of water and help reduce energy use by requiring less energy for drying. This results in overall energy efficiency improvements and cost savings to the manufacturers

EXAMPLES 16-35

Various wax-free mixtures were made by mixing together water, a dispersant (with the exception of one example), optionally potassium hydroxide and Lica® 09 as an additive in varying amounts according to the invention, using an overhead mixer until well dispersed, typically about 5 minutes. In these examples, hot water was used (about 180° F.-200° F.) to improve mixing of the viscous additives. The mixture was then cooled in an ice bath to room temperature while mixing at low speed with an overhead mixer. While polyvinyl alcohol is optional in the formulations described herein, if and when the polyvinyl alcohol was used, the mixture should be heated sufficiently to melt the polyvinyl alcohol, which was done over a hot plate set at 135° C. to 145° C. while mixing with an overhead mixer for 30 minutes. The compositions are shown below in Table 3 along with a control having no organic titanium-based additive, and also showing use of water only.

TABLE 1

| Sample | Montan | Fischer-Tropsch | Carnauba | Lica 01 | Lica 09 | Lica 38 | Borica AQ33 | Borica CX200 | Borica CX300 | Borica AP100 | Tyzor TE | Tyzor 217 | Ken React KR TTS |
|---|---|---|---|---|---|---|---|---|---|---|---|---|---|
| Cont. A | X | | | | | | | | | | | | |
| Cont. B | | X | | | | | | | | | | | |
| Cont. C | | | X | | | | | | | | | | |
| 1 | X | | | | 0.1 | | | | | | | | |
| 2 | X | | | | 0.05 | | | | | | | | |
| 3 | X | | | | | 0.1 | | | | | | | |
| 4 | X | | | | | | | | 0.1 | | | | |
| 5 | X | | | | | | | | | | | 0.1 | |
| 6 | X | | | | | | 0.1 | | | | | | |
| 7 | | X | | | 0.1 | | | | | | | | |
| 8 | X | | | | 0.15 | | | | | | | | |
| 9 | X | | | | 0.2 | | | | | | | | |
| 10 | X | | | | | | | | | 0.1 | | | |
| 11 | X | | | | | | | 0.1 | | | | | |
| 12 | X | | | | | | | | | | | 0.1 | |
| 13 | X | | | 0.1 | | | | | | | | | |
| 14 | X | | | | | | | | | | | | 0.1 |
| 15 | | | X | | 0.1 | | | | | | | | |

TABLE 2

| Sample | Water Absorption (weight %) | Slurry Viscosity (sec) | Patty Size (cm) |
|---|---|---|---|
| Control A | 5.2 | 13.3 | 16.5 |
| Control B | 7.4 | 16.5 | 15.25 |
| Control C | 5.2 | 16.5 | 15.25 |
| 1 | 4.5 | 12.2 | 20.25 |
| 2 | 5.5 | 12.1 | 20 |
| 3 | 5.02 | 18.6 | 16 |
| 4 | 5.64 | 17.8 | 15.5 |
| 5 | 5.35 | 20.4 | 16 |
| 6 | 6.4 | 11.9 | 19.5 |
| 7 | 7.5 | 12.6 | 18.5 |
| 8 | 5 | 11.5 | 20.5 |
| 9 | 4.7 | 11.6 | 20.75 |
| 10 | 4.83 | 20.7 | 16 |
| 11 | 5.33 | 18.3 | 16 |
| 12 | 5.36 | 18.2 | 16 |
| 13 | 5.2 | 16.9 | 15.25 |
| 14 | 6.3 | 15.9 | 15.75 |
| 15 | 4.9 | 12.6 | 19.75 |

TABLE 3

| Sample No./Wt (g) | Water | PVOH | Dispersant | Lica 09 Amount | KOH (45%) | Patty Size (cm) | Slurry Viscosity (sec) |
|---|---|---|---|---|---|---|---|
| Cont. | 96.2 | 2.36 | 1.49 | — | 0.5 | — | — |
| Water | 100 | — | — | — | — | 18 | 13.8 |
| 16 | 96.2 | 2.36 | 1.49 | 0.1 | — | 30 | 13.4 |
| 17 | 97.64 | 2.36 | — | 0.1 | 0.5 | 19 | 28.6* |
| 18 | 80.2 | 11.8 | 7.5 | 0.1 | 0.5 | 23 | 19.8 |
| 19 | 85.79 | 11.8 | 1.0 | 1.0 | 0.41 | 25.5 | 22.8* |
| 20 | 94.34 | — | 4.25 | 1.0 | 0.41 | 24 | 16.2 |
| 21 | 85.64 | 5.9 | 7.5 | 0.55 | 0.41 | 23.5 | 24 |
| 22 | 82.99 | 11.8 | 4.25 | 0.55 | 0.41 | 18.5 | 37.2* |
| 23 | 97.59 | — | 1.0 | 1.0 | 0.41 | 26 | 17.2 |
| 24 | 98.49 | — | 1.0 | 0.1 | 0.41 | 26.5 | 19.2 |
| 25 | 91.69 | 5.9 | 1.0 | 1.0 | 0.41 | 20.5 | 35.4# |
| 26 | 96.2 | 2.36 | 1.49 | 0.1 | 0.5 | 24 | 21.1 |
| 27 | 80.2 | 11.8 | 7.5 | 0.5 | 0.5 | 25 | 15.4 |
| 28 | 80.2 | 11.8 | 7.5 | 0.01 | 0.5 | 16 | 33.2 |
| 29 | 80.2 | 11.8 | 7.5 | 1.0 | 0.5 | 23 | 17.2 |
| 30 | 88.89 | 5.9 | 4.25 | 0.55 | 0.41 | 23 | 23.8 |
| 31 | 91.09 | — | 7.5 | 1.0 | 0.41 | 25 | 17.3 |
| 32 | 86.69 | 11.8 | 1.0 | 0.1 | 0.41 | 19 | 53.1# |
| 33 | 91.99 | — | 7.5 | 0.1 | 0.41 | 21 | 20.6 |
| 34 | 98.04 | — | 1.0 | 0.55 | 0.41 | 25 | 20.1 |
| 35 | 89.34 | 5.9 | 4.25 | 0.1 | 0.41 | 20 | 39.1# |

*foamy
very foamy

The control could not be measured for the desired properties as it was too foamy and did not come out of the cup during the test. Excess foam or a defoaming additive can cause detrimental effects to a board manufacturer because of the core structure required to make satisfactory gypsum wallboard. Based on the foregoing it can be seen that the invention provides an advantage in that the additive helps to reduce slurry viscosity (and increase patty size) to the point where water use can be reduced providing an energy savings, since it would enable gypsum wallboard manufacturers to require less energy for drying to remove water from the finished product. Improving (reducing) energy use (by reducing drying time) can also help to increase line speed and allows for keeping ovens at the same temperature in addition oven temperatures may be decreased. This results in overall energy efficiency improvements and cost savings to the manufacturer. Such formulations can be used in water-resistant and standard wallboard in that the benefits are achieved in a wax-based water-resistant formulation for gypsum wallboard, and also in formulations which may be made to be wax-free for use in any gypsum wallboard formulation.

In further testing of the present invention, various combinations of materials were tested. Samples included various combinations of surfactants, process water, KOH, PVOH, lignosulfonate and waxes. Results (examples 36-142) as found in Table 4 below also demonstrate the efficacy of the present invention, as exemplified by an increase in patty size of the samples. In these examples, the slurry viscosity was measured by a slump test. The additive blend (1.2 grams) was mixed with 100 grams water and 100 grams stucco (sourced from National Gypsum) by hand for 10 seconds, and an additional 15 seconds on a malt mixer set on medium speed. The resulting slurry was poured into a 2 inch diameter by 2 inch high pipe set on a plexiglass plate. The pipe was pulled vertically and the resulting slurry patty was measured. The patty size (slump) of just water and the stucco was measured at 18.5 cm; this value was used as the control. Any additive blend that provided a slump greater than 18.5 cm was considered to provide more fluidity (lower viscosity) than the control, and thus would allow for greater water reduction potential.

TABLE 4

| SAMPLE: Surfactant 1 | Surf. 1 wt % | Process Water (wt %) | KOH (wt %) | PVOH (wt %) | Ligno-sulfonate(s) (wt %) | Wax blend (wt %) | Surfactant 2 | Surf. 2 wt % | Patty Size (cm) |
|---|---|---|---|---|---|---|---|---|---|
| 36: Borica AP100 | 0.1 | 60.35 | 0.41 | 2.36 | 0.42 | 35.4 | | | 18.3 |
| 37: Borica AQ33 | 0.1 | 60.35 | 0.41 | 2.36 | 0.42 | 35.4 | | | 18.3 |
| 38: Borica CX200 | 0.1 | 60.35 | 0.41 | 2.36 | 0.42 | 35.4 | | | 18.3 |
| 39: Borica CX300 | 0.1 | 60.35 | 0.41 | 2.36 | 0.42 | 35.4 | | | 17.7 |
| 40: Tyzor 217 | 0.1 | 60.35 | 0.41 | 2.36 | 0.42 | 35.4 | | | 18.3 |
| 41: Tyzor TE | 0.1 | 60.35 | 0.41 | 2.36 | 0.42 | 35.4 | | | 18.3 |
| 42: Lica 01 | 0.1 | 60.35 | 0.41 | 2.36 | 0.42 | 35.4 | | | 17.4 |
| 43: Lica 38 | 0.1 | 60.35 | 0.41 | 2.36 | 0.42 | 35.4 | | | 22.3 |
| 44: Ken React KR TTS | 0.1 | 60.35 | 0.41 | 2.36 | 0.42 | 35.4 | | | 18.0 |
| 45: Lica 09 | 0.1 | 96.2 | 0.5 | 2.36 | 0.42 | 0 | | | 24.0 |
| 46: Lica 09 | 0.1 | 97.64 | 0.36 | 2.36 | 0 | 0 | | | 19.0 |
| 47: Lica 09 | 0.5 | 80.2 | 0.5 | 11.8 | 2.1 | 0 | | | 25.0 |
| 48: Lica 09 | 0.1 | 60.35 | 0.41 | 2.36 | 0.42 | 35.4 | | | 22.5 |
| 49: Lica 09 | 1 | 85.79 | 0.41 | 11.8 | 0.28 | 0 | | | 25.5 |
| 50: Lica 09 | 1 | 85.79 | 0.41 | 11.8 | 0.28 | 0 | | | 25.5 |
| 51: Lica 09 | 0.55 | 88.89 | 0.41 | 5.9 | 1.19 | 0 | | | 23.0 |

TABLE 4-continued

| SAMPLE: Surfactant 1 | Surf. 1 wt % | Process Water (wt %) | KOH (wt %) | PVOH (wt %) | Ligno-sulfonate(s) (wt %) | Wax blend (wt %) | Surfactant 2 | Surf. 2 wt % | Patty Size (cm) |
|---|---|---|---|---|---|---|---|---|---|
| 52: Lica 09 | 1 | 94.34 | 0.41 | 0 | 1.19 | 0 | | | 24.0 |
| 53: Lica 09 | 1 | 91.09 | 0.41 | 0 | 2.1 | 0 | | | 25.0 |
| 54: Lica 09 | 0.55 | 85.64 | 0.41 | 5.9 | 2.1 | 0 | | | 23.5 |
| 55: Lica 09 | 0.1 | 86.69 | 0.41 | 11.8 | 0.28 | 0 | | | 19.0 |
| 56: Lica 09 | 0.55 | 82.99 | 0.41 | 11.8 | 1.19 | 0 | | | 18.5 |
| 57: Lica 09 | 0.1 | 91.99 | 0.41 | 0 | 2.1 | 0 | | | 21.0 |
| 58: Lica 09 | 1 | 97.59 | 0.41 | 0 | 0.28 | 0 | | | 26.0 |
| 59: Lica 09 | 0.55 | 98.04 | 0.41 | 0 | 0.28 | 0 | | | 25.0 |
| 60: Lica 09 | 0.1 | 98.49 | 0.41 | 0 | 0.28 | 0 | | | 26.5 |
| 61: Lica 09 | 0.1 | 89.34 | 0.41 | 5.9 | 1.19 | 0 | | | 20.0 |
| 62: Lica 09 | 0.55 | 88.89 | 0.41 | 5.9 | 1.19 | 0 | | | 20.5 |
| 63: Lica 09 | 1 | 91.69 | 0.41 | 5.9 | 0.28 | 0 | | | 20.5 |
| 64: Lica 09 | 1 | 91.09 | 0.41 | 0 | 2.1 | 0 | | | 25.0 |
| 65: Lica 09 | 0.55 | 98.04 | 0.41 | 0 | 0.28 | 0 | | | 25.0 |
| 66: Lica 09 | 1 | 97.59 | 0.41 | 0 | 0.28 | 0 | | | 23.0 |
| 67: Lica 09 | 0.9 | 97.19 | 0.41 | 0 | 0.42 | 0 | | | 23.5 |
| 68: Lica 09 | 0.75 | 97.84 | 0.41 | 0 | 0.28 | 0 | | | 23.0 |
| 69: Lica 09 | 1 | 96.59 | 0.41 | 0 | 0.56 | 0 | | | 24.0 |
| 70: Lica 09 | 1.25 | 97.34 | 0.41 | 0 | 0.28 | 0 | | | 23.0 |
| 71: Lica 09 | 1.5 | 97.09 | 0.41 | 0 | 0.28 | 0 | | | 23.5 |
| 72: Sodium p-toluenesulfonate | 1 | 97.59 | 0.41 | 0 | 0.28 | 0 | | | 17.5 |
| 73: p-toluenesulfonamide | 1 | 97.59 | 0.41 | 0 | 0.28 | 0 | | | 17.0 |
| 74: Sodium p-toluenesulfonate | 1 | 97.59 | 0.41 | 0 | 0.28 | 0 | | | 17.0 |
| 75: Lica 09 | 1 | 97.59 | 0.41 | 0 | 0 | 0 | sodium p-toluenesulfonate | 1 | 22.5 |
| 76: Lica 09 | 1 | 97.59 | 0.41 | 0 | 0 | 0 | p-toluenesulfonamide | 1 | 22.0 |
| 77: Lica 09 | 1 | 97.59 | 0.41 | 0 | 0 | 0 | sodium p-toluenesulfonate | 1 | 21.5 |
| 78: Lica 09 | 1 | 97.59 | 0.41 | 0 | 0 | 0 | Ethacryl ®G | 1 | 24.0 |
| 79: Lica 09 | 1.4 | 84.79 | 0.41 | 5.9 | 2.1 | 0 | | | 25.5 |
| 80: Lica 09 | 2 | 81.09 | 0.41 | 9 | 2.1 | 0 | | | 25.0 |
| 81: Lica 09 | 2 | 87.59 | 0.41 | 9 | 0.28 | 0 | | | 23.5 |
| 82: Lica 09 | 1 | 90.09 | 0.41 | 0 | 2.1 | 0 | | | 26.0 |
| 83: Lica 09 | 1 | 97.59 | 0.41 | 0 | 0 | 0 | G3300 (Stepan) | 1 | 24.0 |
| 84: Lica 09 | 1 | 97.59 | 0.41 | 0 | 0 | 0 | Biosoft ®S101 | 1 | 22.5 |
| 85: Lica 09 | 1 | 97.59 | 0.41 | 0 | 0 | 0 | Bioterge ® PAS 8S | 1 | 22.0 |
| 86: Lica 09 | 1 | 97.59 | 0.41 | 0 | 0 | 0 | Bioterge PAS 7S | 1 | 22.0 |
| 87: Lica 09 | 1 | 97.59 | 0.41 | 0 | 0 | 0 | Biosoft D40 | 1 | 23.5 |
| 88: Lica 09 | 1 | 97.59 | 0.41 | 0 | 0 | 0 | Stepanate ® AXS | 1 | 23.5 |
| 89: Lica 09 | 1 | 97.59 | 0.41 | 0 | 0 | 0 | Stepanate SCS | 1 | 22.5 |
| 90: Tytan ZPN | 1 | 97.59 | 0.41 | 0 | 0.28 | 0 | | | 18.3 |
| 91: Lica 09 | 1 | 97.59 | 0.41 | 0 | 0 | 0 | Biosoft NA Acid | 1 | 23.5 |
| 92: Lica 09 | 1 | 97.59 | 0.41 | 0 | 0 | 0 | Stepanate PTSA-G | 1 | 22.5 |
| 93: Lica 09 | 1 | 97.59 | 0.41 | 0 | 0 | 0 | Stepanate AS-1246 | 1 | 21.5 |
| 94: Lica 09 | 1 | 90.59 | 0.41 | 0 | 2.1 | 0 | PR1145 ® (Siltech) | 0.1 | 26.7 |
| 95: Lica 09 | 1 | 90.59 | 0.41 | 0 | 2.1 | 0 | Silsurf ® A004D | 0.5 | 30.0 |
| 96: Lica 09 | 1 | 90.59 | 0.41 | 0 | 2.1 | 0 | Silsurf A008UP | 0.5 | 28.5 |
| 97: Lica 09 | 1 | 90.59 | 0.41 | 0 | 2.1 | 0 | Silsurf Di1010 | 0.5 | 23.5 |
| 98: Lica 09 | 0.01 | 85.59 | 0.5 | 11.8 | 2.1 | 0 | | | 16.0 |
| 99: Lica 09 | 0.10 | 85.50 | 0.5 | 11.8 | 2.1 | 0 | | | 23.0 |
| 100: Lica 09 | 1.00 | 84.70 | 0.5 | 11.7 | 2.1 | 0 | | | 27.0 |
| 101: Lica 09 | 0.10 | 61.31 | 0.41 | 2.36 | 0.42 | 35.4 | | | 23.0 |
| 102: Silsurf A008UP | 7.5 | 53.50 | 0 | 0 | 31.5 | 0 | Lica 09 | 7.5 | n/a [1] |
| 103: Lica 09 | 7.5 | 53.50 | 0 | 0 | 31.5 | 0 | Polystep ™ A16 | 7.5 | n/a [2] |
| 104: Lica 09 | 7.5 | 53.50 | 0 | 0 | 31.5 | 0 | Ethacryl G | 7.5 | n/a [2] |
| 105: Lica 09 | 7.5 | 53.50 | 0 | 0 | 31.5 | 0 | Nuosperse ® 2008 | 7.5 | n/a [3] |
| 106: Lica 09 | 7.5 | 53.50 | 0 | 0 | 31.5 | 0 | Easy-Wet ™ 20 | 7.5 | n/a [4] |
| 107: Lica 09 | 7.5 | 53.50 | 0 | 0 | 31.5 | 0 | Surfadone ® LP100 | 7.5 | n/a [5] |
| 108: Lica 09 | 7.5 | 53.50 | 0 | 0 | 31.5 | 0 | Surfadone LP300 | 7.5 | n/a [5] |
| 109: Lica 09 | 3.8 | 52.94 | 0 | 0 | 31.5 | 0 | Pluronic ® 17R2 | 11.76 | 25.3 |
| 110: Lica 38 | 15.0 | 53.50 | 0 | 0 | 31.5 | 0 | | | 0 [6] |
| 111: Borica AP100 | 15.0 | 53.50 | 0 | 0 | 31.5 | 0 | | | 0 [7] |
| 112: Borica AQ33 | 15.0 | 53.50 | 0 | 0 | 31.5 | 0 | | | 0 [7] |
| 113: Borica CX200 | 15.0 | 53.50 | 0 | 0 | 31.5 | 0 | | | 0 [7] |
| 114: Borica CX300 | 15.0 | 53.50 | 0 | 0 | 31.5 | 0 | | | 0 [7] |
| 115: Tyzor 217 | 15.0 | 53.50 | 0 | 0 | 31.5 | 0 | | | 0 [7] |
| 116: Tyzor TE | 15.0 | 53.50 | 0 | 0 | 31.5 | 0 | | | 0 [7] |
| 117: Ken React KR TTS | 15.0 | 53.50 | 0 | 0 | 31.5 | 0 | | | 25.0 [8] |
| 118: Lica 01 | 15.0 | 53.50 | 0 | 0 | 31.5 | 0 | | | 27.5 [8] |
| 119: Lica 38 | 5.0 | 63.50 | 0 | 0 | 31.5 | 0 | | | 23.5 [9] |
| 120: Borica AP100 | 5.0 | 63.50 | 0 | 0 | 31.5 | 0 | | | 20.5 [10] |
| 121: Borica AQ33 | 5.0 | 63.50 | 0 | 0 | 31.5 | 0 | | | 24.5 [11] |
| 122: Borica CX200 | 5.0 | 63.50 | 0 | 0 | 31.5 | 0 | | | 24.0 |
| 123: Borica CX300 | 5.0 | 63.50 | 0 | 0 | 31.5 | 0 | | | 0.0 [12] |
| 124: Tyzor 217 | 5.0 | 63.50 | 0 | 0 | 31.5 | 0 | | | 23.5 |
| 125: Lica 09 | 5.0 | 63.50 | 0 | 0 | 31.5 | 0 | | | 26.0 |
| 126: Lica 01 | 15.0 | 53.50 | 0 | 0 | 31.5 | 0 | | | 25.5 [13] |
| 127: Ken React KR TTS | 15.0 | 53.50 | 0 | 0 | 31.5 | 0 | | | 25.0 [13] |

TABLE 4-continued

| SAMPLE: Surfactant 1 | Surf. 1 wt % | Process Water (wt %) | KOH (wt %) | PVOH (wt %) | Ligno-sulfonate(s) (wt %) | Wax blend (wt %) | Surfactant 2 | Surf. 2 wt % | Patty Size (cm) |
|---|---|---|---|---|---|---|---|---|---|
| 128: Tyzor TE | 15.0 | 53.50 | 0 | 0 | 31.5 | 0 | | | 17.5 [14] |
| 129: KR TTS | 5.0 | 63.50 | 0 | 0 | 31.5 | 0 | | | 25.0 |
| 130: KR 9S | 5.0 | 63.50 | 0 | 0 | 31.5 | 0 | | | 23.0 |
| 131: KR NZ09 | 5.0 | 63.50 | 0 | 0 | 31.5 | 0 | | | 0.0 [15] |
| 132: KR238M | 5.0 | 63.50 | 0 | 0 | 31.5 | 0 | | | 24.5 |
| 133: KR 134SP | 5.0 | 63.50 | 0 | 0 | 31.5 | 0 | | | [15] |
| 134: KR NZ01 | 5.0 | 63.50 | 0 | 0 | 31.5 | 0 | | | 26 [16] |
| 135: Dynasylan ® MEMO | 5 | 63.50 | 0 | 0 | 31.5 | 0 | | | 25 |
| 136: Dynasylan GLYEO | 5 | 63.50 | 0 | 0 | 31.5 | 0 | | | [17] |
| 137: Dynasylan 1411 | 5 | 63.50 | 0 | 0 | 31.5 | 0 | | | 21 |
| 138: Lica 09 | 5 | 32.00 | 0 | 0 | 0 | 0 | Naphthalene Sulfonate | 63 | 27.5 |
| 139: Lica 01 | 5 | 32.00 | 0 | 0 | 0 | 0 | Naphthalene Sulfonate | 63 | 26.5 |
| 140: KR TTS | 5 | 32.00 | 0 | 0 | 0 | 0 | Naphthalene Sulfonate | 63 | 26.5 |
| 141: Lica 38 | 5 | 32.00 | 0 | 0 | 0 | 0 | Naphthalene Sulfonate | 63 | 28 |
| 142: Tyzor TE | 5 | 32.00 | 0 | 0 | 0 | 0 | Naphthalene Sulfonate | 63 | 28 |

[1] wax
[2] solid
[3] heavy paste
[4] solid
[5] solution separated
[6] blend aborted
[7] solid
[8] lignosulfonate holds blend together
[9] blend thick
[10] lignosulfonate settled on bottom of cup
[11] blend thick
[12] blend solid
[13] lignosulfonate holds blend together
[14] nearly solid overnight
[15] would not mix with water
[16] lignosulfonate compatible with water
[17] solution solid overnight It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A wax emulsion useful for gypsum-based building products, comprising,
water;
at least one wax;
a dispersant; and
an additive comprising an organic zirconium compound and/or an organic titanium compound having a chemical formula:

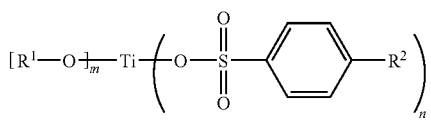

wherein $R^1$ may be a straight or branched chain, substituted or unsubstituted, alkyl, alkenyl, aralkyl, aralkenyl group of from about 5 to about 30 carbon atoms, wherein the group has from zero to or about 10 oxygen atoms; $R^2$ may be the same or different than $R^1$; m and n are integers and each is at least 1 and no greater than 4.

2. The wax emulsion according to claim 1, wherein the at least one wax comprises one or more of montan wax, paraffin wax, carnauba wax, a Fischer-Tropsch wax, and derivatives and blends thereof.

3. The wax emulsion according to claim 2, wherein the at least one wax is a blend of paraffin wax with montan wax.

4. The wax emulsion according to claim 1, comprising a paraffinic hydrocarbon.

5. The wax emulsion according to claim 1, further comprising at least one stabilizer.

6. The wax emulsion according to claim 5, wherein the at least one stabilizer comprises polyvinyl alcohol.

7. The wax emulsion according to claim 6, wherein the polyvinyl alcohol is about 97% to about 100% hydrolyzed polyvinyl alcohol.

8. The wax emulsion according to claim 1, further comprising a saponifying agent.

9. The wax emulsion according to claim 8, wherein the saponifying agent is an alkali metal hydroxide.

10. A mixture useful for gypsum-based building products, comprising:
water;
a dispersant or blend of dispersants; and
an additive comprising an organic zirconium compound and/or an organic titanium compound having a chemical formula:

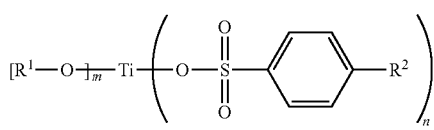

wherein $R^1$ may be a straight or branched chain, substituted or unsubstituted, alkyl, alkenyl, aralkyl, aralkenyl group of from about 5 to about 30 carbon atoms, wherein the group has from zero to or about 10 oxygen atoms; $R^2$ may be the same or different than $R^1$; m and n are integers and each is at least 1 and no greater than 4.

11. The mixture according to claim 10, wherein the dispersant comprises a sulfonate or a sulfonate-containing group.

12. The mixture according to claim 10, wherein the dispersant is lignosulfonic acid, naphthalene sulfonic acid, and combinations and salts thereof.

13. The mixture according to claim 10, comprising: about 70 percent by weight to about 99.9 percent by weight of the water; about 0.01 percent by weight to about 10 percent by weight of the dispersant; about 0.001 percent by weight to about 10 percent by weight of the additive; and 0 to about 30 percent by weight of at least one stabilizer.

14. The mixture according to claim 13, comprising: about 80 percent by weight to about 99.9 percent by weight of the water; about 0.01 percent by weight to about 8 percent by weight of the dispersant; about 0.1 percent by weight to about 2.0 percent by weight of the additive; and about 0 percent by weight to about 10 percent by weight of the at least one stabilizer.

15. The mixture according to claim 10, wherein the additive is selected from the group consisting of titanium IV 2,2(bis-2-propenolatomethyl)butanolato, tris-neodecanato-O; titanium IV 2,2(bis-2-propenolatomethyl)butanolato, tris(dodecyl)benezenesulfanato-O; titanium IV 2,2(bis-2-propenolatomethyl)butanolato, tris(dioctyl)pyrophosphate-O; titanium IV 2-propenolatomethyl, tris-isooctadecanoato-O; sodium zirconium lactate; triethanolamine titanium complex; titanium phosphate complex; alkanolamine titanate; and titanium chelate.

16. The mixture according to claim 10, wherein $R^1$ is a branched chain alkenyloxy group of about 5 to about 12 carbon atoms and $R^2$ is different from $R^1$ and is a straight chain alkyl group of about 10 to about 15 carbon atoms; m is 1 and n is 3.

17. The mixture according to claim 10, wherein the additive has a chemical formula:

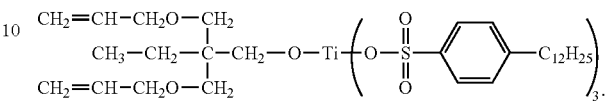

18. A method for reducing energy use in the manufacture of a building product, wherein the building product is gypsum wallboard, comprising,
adding to a formulation for forming the building product a mixture comprising:
water;
a dispersant; and
an additive comprising an organic zirconium compound and/or an organic titanium compound having the chemical formula:

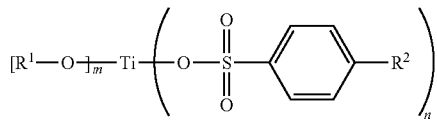

wherein $R^1$ may be a straight or branched chain, substituted or unsubstituted, alkyl, alkenyl, aralkyl, aralkenyl group of from about 5 to about 30 carbon atoms, wherein the group has from zero to or about 10 oxygen atoms; $R^2$ may the same or different than $R^1$; m and n are integers and each is at least 1 and no greater than 4.

19. The method according to claim 18, wherein the building product is a water-resistant building product and the mixture is a wax emulsion, and wherein the wax emulsion comprises at least one wax.

* * * * *